United States Patent
Frazier

[11] 3,861,897
[45] Jan. 21, 1975

[54] STABILIZATION OF POLYPHOSPHATE FERTILIZER SOLUTIONS

[75] Inventor: Alva W. Frazier, Florence, Ala.

[73] Assignee: Tennessee Valley Authority, Muscle Shoals, Ala.

[22] Filed: Oct. 13, 1972

[21] Appl. No.: 297,246

Related U.S. Application Data

[63] Continuation-in-part of Ser. No. 141,366, May 7, 1971, Pat. No. 3,711,268, which is a continuation of Ser. No. 82,809, Oct. 21, 1970, which is a continuation-in-part of Ser. No. 30,264, April 20, 1970, abandoned.

[52] U.S. Cl. .................................... 71/34, 71/64 C
[51] Int. Cl. .............................................. C05b 7/00
[58] Field of Search .............. 71/34, 64 C, 35, 36, 1

[56] References Cited
UNITED STATES PATENTS

| | | | |
|---|---|---|---|
| 3,024,099 | 3/1962 | Matiinson | 71/34 |
| 3,057,711 | 10/1962 | Reusser et al. | 71/43 |
| 3,088,819 | 5/1963 | Funkhouser | 71/36 X |
| 3,290,140 | 12/1966 | Young | 71/64 C X |
| 3,697,247 | 10/1962 | Jones | 71/34 |

OTHER PUBLICATIONS

Frazier, Def. Pub. of Serial No. 82,809-h led 10/21/70, published in 890 OG 981 on 9/21/71–Def. Publ. No. T890,010, 71-34.

Primary Examiner—Samih N. Zaharna
Assistant Examiner—Richard Barnes

[57] ABSTRACT

A minor excess of fluoride over that required to react with all the aluminum and magnesium in ammonium and potassium polyphosphate liquid fertilizer solutions will prevent the precipitation of these elements. Effectively, this addition of excess fluoride shifts the solution composition from a region where the water-insoluble precipitate $MgAl(NH_4)_5(P_2O_7)_2F_2 \cdot 6H_2O$ (I), is stable to a region where the water-soluble form, dimorph II, is stable; thus the metallic cations are sequestered.

1 Claim, 1 Drawing Figure

EFFECT OF POLYPHOSPHATE ON VALUE OF S.R.

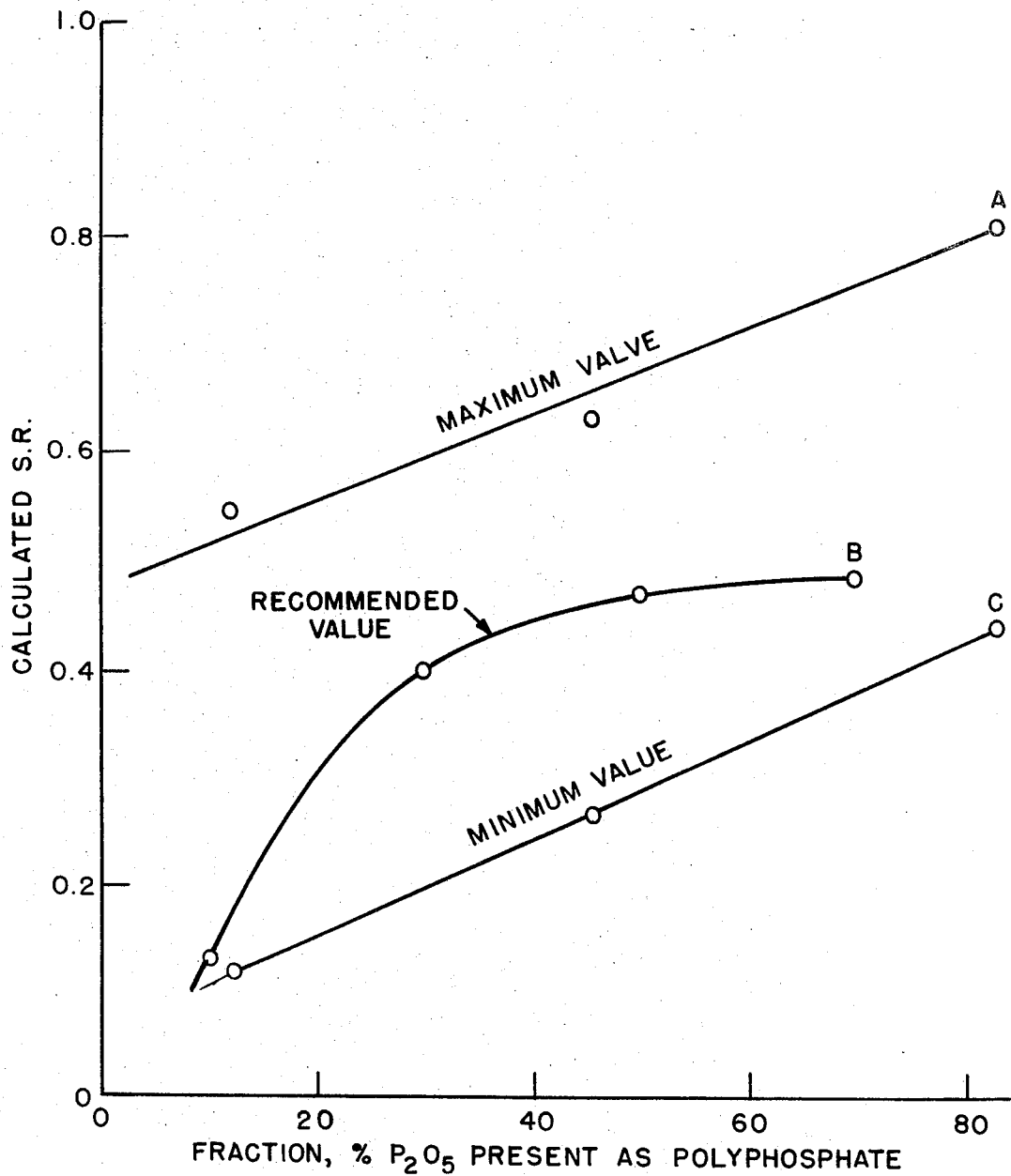
EFFECT OF POLYPHOSPHATE ON VALUE OF S.R.

STABILIZATION OF POLYPHOSPHATE FERTILIZER SOLUTIONS

This application is a continuation-in-part of my copending application Ser. No. 141,366, filed May 7, 1971, now U.S. Pat. No. 3,711,268 which, in turn, is a continuation of Ser. No. 82,809, filed Oct. 21, 1970 (now Defensive Publication No. T890,010); which is a continuation-in-part of Ser. No. 30,264, filed Apr. 20, 1970 (now abandoned); all for STABILIZATION OF POLYPHOSPHATE FERTILIZER SOLUTIONS.

The invention herein described may be manufactured and used by or for the Government for governmental purposes without the payment to us of any royalty therefor.

My invention relates to a new and improved method for the stabilization of ammonium polyphosphate liquid fertilizer solutions; particularly it relates to the prevention of precipitation principally of magnesium and aluminum salts in liquid ammonium polyphosphate fertilizer solutions prepared from the ammoniation of acid of the wet-process type; and still more particularly it relates to the prevention of precipitation of magnesium and aluminum salts, i.e., the sequestration thereof by a method of complexing ions of magnesium and aluminum salts present in ammonium polyphosphate solutions from the ammoniation of wet-process phosphoric acid.

Liquid mixed fertilizers having compositions similar to those of standard dry-mixed fertilizers are well known in the industry and are ever increasing in popularity. Such solutions have the advantage over dry mixed fertilizers in that costs of evaporating water and bagging are eliminated and, perhaps even more importantly, the application to soil is greatly simplified over the use of solid fertilizers and eliminates difficulty due to segregation and caking often encountered in storage of dry fertilizers. However, liquid fertilizers have in the past had some outstanding disadvantages. Raw-material costs have, up until the advent of wet-process phosphoric acid, been relatively high and the solutions produced, in many instances, have not been able to compete economically with solid fertilizer products. Solutions in the early development of fertilizer solutions were limited to a maximum plant food content of about 33 percent by weight in that in concentration thereabove there occurred unwanted and undesired crystallization and precipitation of salts. One of several recent and perhaps the most significant breakthroughs in overcoming these disadvantages in liquid mixed fertilizers in taught and described in U.S. Pat. No. 2,950,961, Striplin et al. Therein Striplin teaches that he is able to prepare a liquid mixed fertilizer solution containing substantial values of the primary plant nutrients in a process wherein he ammoniates high purity superphosphoric acid under controlled conditions. It is perhaps noteworthy that although Striplin's teachings appear to be mostly concerned with the ammoniation of superphosphoric acid of the furnace type, he does not appear to be completely limited thereto in that he states the source of his superphosphoric acid could be from any number of means or processes including the evaporation of water from orthophosphoric acid and presumably could be of either the wet or furnace type. Albeit this is taught in Striplin, there is claimed another breakthrough in overcoming the disadvantages in liquid mixed fertilizers in application Ser. No. 835,377, Getsinger, assigned to the assignee of the present invention, and in U.S. Pat. No. 3,044,851, D. C. Young. The improvements disclosed therein generally relate to the production of superphosphoric acid of the wet-process type by a separate heating and concentrating step in which the starting acid is orthophosphoric. The heat-treated acid is concentrated and condensed to bring about the in situ formation of pyrophosphoric, tripolyphosphoric, and higher species of polyphosphoric acid, such as to render the acid product similar in many ways to what is now commonly referred to as furnace superphosphoric acid, the principal difference being in the amount or degree of impurities contained in the more impure wet super acid, which impurities are principally iron and aluminum, together with magnesium and other congeneric impurities leached from the phosphate rock in the preparation of these acids.

In still another fairly recent breakthrough in overcoming some of the disadvantages of producing liquid fertilizer solutions by the prior-art methods, there is found in U.S. Pat. No. 3,382,059, Getsinger, the teaching of completely eliminating the separate heating and concentration step for ortho wet-process phosphoric acid by a direct process which utilizes in a unique manner the heat of reaction from ammonia for directly producing ammonium polyphosphate solutions, melts, or suspensions from ortho wet-process phosphoric acid.

My invention is not directed primarily to the production of ammonium polyphosphate solutions principally derived from the ammoniation of wet-process phosphoric acid, but rather it is directed to an improvement in stabilizing such ammonium polyphosphate solutions before or after they are produced, and my invention is directed specifically to such solutions which are derived, in whole or in part, from wet-process phosphoric acid. In the production of such solutions the grade of the finished material is kept within the range from about 8-24-0 to about 11-37-0, and if all conditions for manufacturing and processing thereof are carefully controlled by now known prescribed methods, the resulting solutions will sometimes remain, upon subsequent storage and handling, as true solutions without any discernible or significant precipitation of salts therein. However, when the finished grade of these solutions contains greater than about 0.1 percent MgO, for instance about an average value of 0.4 percent MgO (oftentimes resulting from the desirous use of less expensive phosphate rock raw material), the industry has then experienced the unfortunate precipitation of principally magnesium and aluminum salts in such liquid ammonium polyphosphate fertilizer solutions prepared from wet-process phosphoric acid. This problem is a serious one in the fertilizer industry and is encountered at all process and handling points between the manufacturer and the farmer applying the fertilizer in the field. The manufacturer encounters plugged valves, lines, and storage tanks; however, at this point, the required technical abilities are usually available to circumvent the problem at hand. Still, however, drastic measures may be required at these points of processing, as for example, excessive sediments in the storage tanks of the manufacturer can sometimes be removed only by means of employing explosive action to dislodge the sediments thereby oftentimes weakening the storage tank structure. It is, however, after the product leaves the manufacturer that the lack of technically trained personnel complicates the precipitation problems several fold. For example, strong acid solutions cannot be used to dissolve these precipitates which have plugged river barges or railroad tank cars. Likewise, the sediment in these instances usually aren't deep enough to be susceptible to removal by explosive.

In my earlier work, I have helped to solve this specific problem of precipitates formed in ammonium polyphosphate solutions derived in whole or in part from the ammoniation of wet-process phosphoric acid by shifting the solution compositions to a mildly acidic condition through the use of phosphoric acid until the solid phases representing the precipitates are no longer stable and will dissolve slowly without damage to the tank cars. However, these results of my earlier work have proven to be time-consuming and require the acquisition and careful handling of phosphoric acid, which is usually not readily available at either the distribution centers or to the farmers, who have the same precipitation problems in their equipment as do the manufacturers.

I have now developed a new, novel, and unique method for stabilizing such ammonium polyphosphate fertilizer solutions, near neutral pH conditions, derived in whole or in part from wet-process phosphiric acid and which are produced at concentrations or grades wherein the aforementioned precipitation problem occurs. These problems can now be alleviated through exploitation of my discovery that fluorine, as either fluoride or fluosilicate, is an efficient complexing agent for the cations in these solutions responsible for precipitate formation and that this complexing agent will prevent the precipitation when added to or maintained at the proper concentration in such liquid fertilizer solutions.

In my work I have found that the most common precipitate in typical ammonium polyphosphate liquid fertilizers made from wet-process acid products of low fluoride content is a crystalline salt with the chemical composition of $MgAl(NH_4)_5(P_2O_7)_2 \cdot F_2 \cdot 6H_2O$ (I) (water-insoluble dimorph). In completely defluorinated wet-process acid products, the compound that precipitates is $Mg(NH_4)_2P_2O_7 \cdot 4H_2O$ (orthorhombic dimorph). The amount of fluoride remaining in wet-process acid products prepared in the usual manner frequently is insufficient for precipitation of all the magnesium as the complex fluoride compound, so that some $Mg(NH_4)_2P_2O_7 \cdot 4H_2O$ (O) is precipitated also. Other precipitates containing magnesium or aluminum that are known to occur in these fertilizer solutions, but are found less often are $Mg(NH_4)_2P_2O_7 \cdot 4H_2O$ (monoclinic dimorph), $Mg(NH_4)_6(P_2O_7)_2 \cdot 6H_2O$, $MgNH_4PO_4 \cdot 6H_2O$, and $Al(NH_4)_2P_2O_7OH \cdot 3H_2O$.

From these observations, therefore, I became aware that the problem of solid-phase formation associated with these liquid fertilizers centers around the key impurities magnesium, aluminum, and fluorine. A serious complicating factor that obscures their importance when these products are initially produced is that these precipitation processes require an incubation period before troublesome crystallization begins. Thus, solid-phase precipitation problems belatedly occur at unexpected points after production and during handling, distribution, and field application. The typical conditions that arise due to delayed precipitation are plugged valves, sludge buildup in storage tanks, river barges, or railroad tank cars, and formulation and handling problems at distribution centers. corrective measures are extremely difficult to carry out at distribution centers or during field application because heretofore about the only effective method has been to adjust the pH of the solution to a low value, since acidic solutions are necessary to dissolve these water-insoluble compounds.

This problem has been considered in the prior art and only two basic processes seem to have been proposed to decrease the severity of the problem. In one process, the wet-process phosphoric acid is fully defluorinated[1,2] by heating before ammoniation, thus preventing the formation of $MgAl(NH_4)_5(P_2O_7)_2F_2 \cdot 6H_2O$ (I) (water-insoluble dimorph) which otherwise crystallizes readily as it has a relatively short nucleation period. The fluoride-free fertilizer liquid is still capable of forming unwanted precipitates, but the only mitigating circumstance here is that these precipitates usually require a longer time for crystallization to begin. Thus, if the products are produced and used within a relatively short time (2 to 6 weeks), the chance that a troublesome precipitate will form is small.

[1] Suzuki, Y., and Homma, K., Removal of Fluorine from Phosphoric Acid, Japanese Pat. No. 6,817,416, July 23, 1968.
[2] Shearon, G. B., and Stevenson, G. L., Defluorination of Phosphoric Acid, U.S. Pat. No. 3,429,663, Feb. 25, 1969.

In the other process, the liquid product prepared from wet-process acid is diluted with about one-half its volume of the more expensive ammonium polyphosphate product prepared from high purity, electric-furnace grade superphosphoric acid,[3] a material that contains no magnesium or aluminum impurities. This blending dilutes the impurities contributed by the wet-process acid to a lower degree of supersaturation so that the incubation period required for initiation of precipitation is lengthened. Here again, however, there is still the risk of delayed precipitation, so that the product must be consumed within a limited storage time. This second process, however, is somewhat superior to the first because the dilution of any wet-process acid product will decrease the total amount of possible precipitate by one-third. Both processes simply attempt to circumvent or decrease the severity of this problem by lowering the content of magnesium, aluminum, or fluorine impurities. Another associated process which has been accepted to circumvent this problem is the production of suspension fertilizer fluids.[4,5,6] In this process, higher grade fertilizers are obtained by suspending solid phases which are in equilibrium with the liquid phase in such a manner that precipitating impurities do not interfere with the characteristics of the fertilizers. For example, the impurities of magnesium, aluminum, and fluoride always precipitate in these products as very small crystals which are readily suspended when compared to the crystalline phases of the primary fertilizer materials, such as $KCl$, $KNO_3$, $(NH_4)_2HPO_4$, and/or $NH_4H_2PO_4$. Again, however, this process has its inherent problems due to excessive crystal growth of the primary nutrient materials to a size which can no longer be suspended and also due to the breakdown of the suspending agents which are available for this purpose.

[3] Striplin, M. M., Jr., Stinson, J. M., and Wilbanks, J. A., U.S. Pat. No. 3,015,552, Jan. 2, 1962.
[4] Silverberg, J., and Walters, H. K., Com. Fertilizers, 108 (4), 26–7, 66–7, April 1964.
[5] Slack, A. V., and Nason, M. C., J. Agr. Food Chem., 9 343-8 (Sept.-Oct. 1961) "Liquid Fertilizers from Wet-Process Phosphoric Acid. Suspension of Impurities."
[6] Slack, A. V., Farm Chemicals, 128 (5), 21–2, 24, 26, May 1965.

It is therefore the principal object of the present invention to stabilize ammonium polyphosphate fertilizer solutions derived in whole or in part from wet-process phosphoric acid and of grades up to about 11–37–0 wherein the formation of undesirable precipitates is encountered, principally caused by the cations of magnesium and aluminum salts by the controlled addition thereto of fluorine, as either fluoride or fluosilicate, as an efficient complexing agent for these ions to thereby render them unavailable for post-precipitation in the stabilized solutions.

I have discovered that the foregoing and other objects of the present invention can be obtained by the addition of fluoride to these same solutions in moderate amounts over and above the amount already present to prevent the formation of these salts by shifting the solution composition to a region in which only soluble complexes or their water-soluble salts are stable and can be maintained in solution, namely, the crystalline compounds $MgAl(NH_4)_5(P_2O_7)_2F_2 \cdot 6H_2O$ (II) (water-soluble dimorph), $Mg(NH_4)_6(P_2O_7)_2 \cdot 6H_2O$, and $(NH_4)_3AlF_6$.

In carrying out the objects of my invention in the principal forms thereof, I have found that, for my process to be effective, the fluoride content must be held within a certain concentration range. If the fluoride exceeds the prescribed amount, precipitation of these water-soluble salts then becomes possible, thereby creating a problem similar to that experienced when the fluoride content is too low. On the other hand, additions of fluoride to a concentration below the prescribed level only increases the unwanted precipitation problem by forming more $MgAl(NH_4)_5(P_2O_7)_2F_2 \cdot 6H_2O$ (I) until one of the requisite constituents ($MgO$, $Al_2O_3$, or F) has been completely removed from solution. This discovery of an optimum range of fluoride or fluosilicate content which gives maximum complexing properties offers a process by which these products can be essentially stabilized or clarified of magnesium and/or aluminum precipitates that may otherwise separate. The amount to be added has been established by experimental tests and may be determined by an empirical computation.

Several factors that control the fluoride sequestration of magnesium and aluminum by formation of soluble complexes have been tested in these experimental solutions. The most significant test results are summarized in table I, infra. The samples used for these studies were prepared from stock ammonium polyphosphate solutions along with other reagents to give different concentrations of $MgO$, $Al_2O_3$, F, and polyphosphate and a range of pH values. The mixtures were then seeded with the undesirable compound, $MgAl(NH_4)_5(P_2O_7)_2F_2 \cdot 6H_2O$ (I) and allowed to equilibrate at 25° C. at least 3 weeks before being filtered. The precipitates were examined microscopically and the filtrates were analyzed chemically. The compositions of the clear filtrates then were used to determine the extent to which the fluoride could sequester the magnesium and aluminum, thus giving a liquid fertilizer composition that would be stable or could precipitate only negligible amounts of solids at this temperature. The table includes the conditions of each test, the composition of the liquid phase, and the stable solid phases found for these solution compositions.

A simple mathematical relationship has been devised to express these results in terms of a "sequestration ratio" (S. R.) which is hereby defined as a measurement to show the extent to which fluorine can complex magnesium, aluminum, and iron, if present, in a particular solution composition. This value based on the data available for my original application was previously expressed as S.R. = wt.% $Al_2O_3$ + wt.% $MgO$ + 0.33 wt.% $Fe_2O_3$/wt. % F where the optimum value for S.R. was between 1.3 and 1.6. Additional data, now included in table I infra, shows that much more fluoride is needed to sequester aluminum than magnesium. Also, in order that the S.R. value will be directly proportional to the quantity of required fluoride, the revised formulation is expressed as S.R. = %F/wt. % $MgO$ + 3 wt. % $Al_2O_3$ + 0.33 wt. % $Fe_2O_3$ and the optimum value for S.R. is now 0.4 to 0.5 for products having 50 percent of the total $P_2O_5$ as polyphosphate.

My most recent work indicates that the factor for $Al_2O_3$ in the formula just supra is better set at 2.5 rather than 3.0. See *Fertilizer Solutions*, July–August 1972, pages 32–38 and page 43, and Example VIII, infra.

Since typical 10-34-0 or 11-37-0 fertilizer solutions have pH values close to 6.0 and approximately 50 percent of their $P_2O_5$ content as polyphosphate, these conditions were used for most of the examples given in table I, except when these variables themselves were being tested, as shown by the footnotes. In examining these results, it must be remembered that the magnesium and aluminum contents in the post-precipitated, initial liquid products are lowered to as little as 0.01 percent $MgO$ and 0.03 percent $Al_2O_3$ by the precipitation of $MgAl(NH_4)_5(P_2O_7)_2F_2 \cdot 6H_2O$ (I) so that higher concentrations represent cations that have been sequestered. In the absence of fluoride, $Mg(NH_4)_2P_2O_7 \cdot 4H_2O$ and $Al(NH_4)_2P_2O_7OH \cdot 3H_2O$ are the troublesome precipitates. For ammonium polyphosphate products prepared exclusively from wet-process acids that have low magnesium (<0.1 percent) and fluoride (<0.1 percent) contents, the amount of precipitate is not a problem provided the aluminum concentration is no more than about 1 percent $Al_2O_3$. However, the current use of phosphoric acids reclaimed after use for pickling aluminum metal yields products with abnormally high aluminum contents. Excessive sludge formation results from the use of these acids with resulting formation of $Al(NH_4)_2P_2O_7OH \cdot 3H_2O$, in amounts that make it impossible to handle the product with conventional liquid-distributing equipment. Even in ammonium polyphosphate liquids such as those made from reclaimed acids, the addition of fluoride was effective in clarifying or redissolving the aluminum precipitate.

Storage temperatures also may influence precipitation, but preliminary results indicate that no further crystallization occurred when these treated solutions were stored at 0° C. for 4 weeks. The solid phases that would be expected to form on cooling for longer storage periods are still the water-soluble salts mentioned earlier; these would, of course, redissolve on warming to the original temperature. However, under conditions where solids may have formed at low temperatures and means are not available for reheating these products, the solids could be removed readily from clogged fertilizer equipment or storage tanks by simply dissolving them in water. This type of cleanup process cannot be used to dissolve the water-insoluble salts which are the current problem in ammonium polyphosphate liquid fertilizers.

The FIGURE, referred to more specifically in Example VIII, infra, depicts operable and optimum S.R. values of products over a range of about 10 to 80 percent of the total $P_2O_5$ as polyphosphate.

In order that those skilled in the art may better understand how the present invention can be practiced, the following examples of my improved method for stabilizing ammonium polyphosphate solutions against the aforementioned undesirable precipitation are given by way of illustration only and not by way of limitation, and more particularly the following examples are offered principally to show the extent of the complexing power of fluoride on magnesium, aluminum, and iron in ammonium polyphosphate liquid fertilizers. The composition range for %MgO and %$Al_2O_3$ in these tests were chosen to more than cover the values usually found in typical products, the average concentrations of which are about 0.5 percent MgO and 1.0 percent $Al_2O_3$. These values do not necessarily limit the compositions at which fluoride will sequester these cations.

EXAMPLE I

Effect of Ratio of Ortho-$P_2O_5$ to Pyro-$P_2O_5$

The results shown by Group A, Table I below, give the effect of the ratio of ortho- to pyrophosphate on the sequestration ratio. In my original application, this effect was masked by the failure of the S.R. formulation to include the significance of aluminum. More reliable data at 70 percent polyphosphate and an extension of this effect to 10 percent polyphosphate shows that the polyphosphate level is a very significant factor in determining the required quantity of fluoride, i.e., compare the S.R. values and polyphosphate levels for this first group of samples in table I infra. These results show that polyphosphate units over and above that required for sequestration of the iron and aluminum in liquid fertilizer are an uneconomical luxury which is magnified by the fact that an increasing quantity of fluoride is then required to sequester the magnesium.

EXAMPLE II

Effect of pH

Sample Group B, Table I, supra, shows that the pH has an insignificant effect on the sequestration ratio. A slightly higher S.R. value is obtained at pH 6.5 as compared with that at pH 6.0, but it is still well below the recommended value 0.4 to 0.5 for 50 percent polyphosphate products.

EXAMPLE III

Effect of Fluoride Source

The pair of samples in Group C, Table I, supra, show that fluorine as ammonium fluosilicate will sequester magnesium and aluminum as well as or better than fluorine as ammonium fluoride. This effect is significant since the fluosilicate ion can be obtained at low cost at fertilizer plants by scrubbing the offgases from either electric-furnace or acidulation processes for treatment of phosphate rock. Likewise, other soluble sources of fluoride have been tested at a S.R. value of 0.4 and have been found to be equally effective, for example, KF, $K_2SiF_6$, $KHF_2$, $NH_4HF_2$, NaF, $NaHF_2$, $Na_2SiF_6$, HF, and $H_2SiF_6$.

Table I

Sequestration by Fluorine of Impurities in
Ammonium Polyphosphate Fertilizer Solutions (Tests made at pH 6.0 and with equal amounts of
ortho- and pyrophosphate $P_2O_5$. F added as $NH_4F$)

| Mixture | | Composition, %, of clarified solution | | | | | | Sequestration ratio S.R. |
|---|---|---|---|---|---|---|---|---|
| Group | No. | MgO | $Al_2O_3$ | F | $P_2O_5$ | $Fe_2O_3$ | Solid phase[a] | |
| A | 51[c] | 0.51 | 0.70 | 0.90 | 37.0 | | $(NH_4)_3AlF_6$ | .34 |
|   | 1 | 0.51 | 0.46 | 0.78 | 37.1 | | $(NH_4)_3AlF_6$ | .41 |
|   | 18[d] | 0.90 | 0.90 | 1.53 | 34.5 | | $(NH_4)_3AlF_6$+MgAl(I) | .43 |
|   | 3[j] | 0.70 | 0.40 | 0.25 | 34.0 | | None | .12 |
| B | 1H[e] | 1.70 | 1.80 | 2.50 | 34.2 | | MgAl (II) | .35 |
|   | 2H | 1.45 | 1.50 | 2.10 | 35.0 | | MgAl (II) | .35 |
|   | 3H[f] | 0.55 | 0.56 | 0.82 | 31.0 | | MgAl (II) | .37 |
| C | 2H | 1.45 | 1.50 | 2.10 | 35.8 | | MgAl (II) | .35 |
|   | 1S[g] | 1.75 | 1.80 | 2.30 | 38.8 | | MgAl (II) | .32 |
| D | 65B | 1.50 | 1.00 | 2.90 | 35.0 | | $MgN_6$ | .64 |
|   | 56B | 1.60 | 0.45 | 3.60 | 35.4 | | $(NH_4)_3AlF_6$, $MgN_6$ MgAl (II) | 1.20 |
|   | 53B | 0.52 | 0.27 | 1.30 | 37.3 | | $(NH_4)_6AlF_6$, $MgN_6$ | 1.00 |
|   | 59B | 0.21 | 0.04 | 1.20 | 35.6 | | $(NH_4)_6AlF_6$ | 3.60 |
| E | 10A | 0.05 | 0.22 | 0.01 | 36.1 | | MgAl (I) | n.d.[h] |
|   | 13A | 0.03 | 0.03 | 0.15 | 39.4 | | MgAl (I) | n.d. |
|   | 15A | 0.13 | 0.44 | 0.01 | 37.8 | | MgAl (I) | n.d. |
| F | Plant[i] | 0.16 | 0.34 | 0.50 | 32.2 | 0.90 | Not identified | .34 |
|   | 2 | 0.22 | 0.60 | 0.77 | 34.0 | 0.90 | None | .33 |
|   | 3 | 0.40 | 0.80 | 1.10 | 33.0 | 0.40 | None | .38 |
|   | 4 | 0.46 | 0.71 | 1.10 | 34.3 | 0.81 | None | .37 |
|   | 5 | 0.60 | 0.43 | 0.85 | 33.7 | 0.90 | v. minor $(NH_4)_3AlF_6$ | .39 |
|   | 6 | 0.27 | 0.45 | 0.68 | 35.0 | 0.70 | v. minor $(NH_4)_3AlF_6$ | .37 |
|   | 7 | 0.32 | 0.64 | 0.81 | 33.4 | 0.91 | None | .32 |

[a] MgAl (I) = $MgAl(NH_4)_5(P_2O_7)_2F_2.6H_2O$ (I), MgAl (II) = $MgAl(NH_4)_5(P_2O_7)_2F_2.6H_2O$ (II), $MgN_6$ = $Mg(NH_4)_6(P_2O_7)_2.6H_2O$.
[b] S.R. = Wt.%F/wt.% MgO + 3 wt.% $Al_2O_3$ + .33 wt.% $Fe_2O_3$ in solution
[c] Ratio ortho- to pyrophosphate $P_2O_5$ = 70:30.
[d] Ratio ortho- to pyrophosphate $P_2O_5$ = 30:70
[e] pH = 5.5.
[f] pH = 6.5.
[g] F added as $(NH_4)_2SiF_6$.
[h] n.d. = not determined because of uncertainty of small concentrations.
[i] Commercial fertilizer solutions.
[j] Ratio ortho- to pyrophosphate $P_2O_5$ = 90:10; $Fe_2O_3$ = 0.5 wt. %.

EXAMPLE IV

Effect of Excess Fluoride

Group D, Table I, supra, is given to show the effect of excess fluoride on the sequestration ratio and the solid phase composition. An increase in fluoride content gives a larger sequestration ratio for any composition and, at the excessive levels shown by Group D, usually will result in the precipitation of one or more of these solid phases. I found that increasing the fluoride content above that required for sequestration in commercial products would rapidly remove aluminum from solution as solid $(NH_4)_3AlF_6$ and more slowly remove magnesium as $Mg(NH_4)_6(P_2O_7)_2 \cdot 6H_2O$. These data are given to show that, when concentrations are not known precisely or are determined from compositions of the wet-process acid used for their production, it is better to have an excess of fluorine than a deficiency, since it would ensure that any precipitated solids would be water soluble.

EXAMPLE V

Effect of Insufficient fluoride

The samples in Group E, Table I, were prepared initially to give sequestration ratios between 0.1 and 0.3, but each mixture precipitated large amounts of $MgAl(NH_4)_5(P_2O_7)_2F_2 \cdot 6H_2O$ (I). The chemical analyses of these mixtures show that, under these conditions, the amount of the least of the three impurities, $Al_2O_3$, MgO, and F, will determine the amount of precipitate. The precipitate formed at S.R. of 0.3 or below cannot be removed by washing with water. Based on the solid-phase composition, a sequestration ratio of 0.2 would effect the most nearly complete precipitation of all three constituents from solution, so that removal of these impurities by filtration should yield a more desirable, clarified product.

EXAMPLE VI

Test on Commercial Products

For this example, seven fresh commercial 10-34-0 products prepared from wet-process phosphoric acid were divided into several portions to which increasing amounts of fluorine were added, the mixtures were seeded and allowed to equilibrate 6 months with frequent agitation. With 3 days at the insufficient fluoride levels, an increasing amount of $MgAl(NH_4)_5(P_2O_7)_2F_2 \cdot 6H_2O$ (I) was obtained with increasing fluoride content, showing that this precipitation is very rapid when seeds are present. When fluorine concentrations were too high, the amount of solid $(NH_4)_3AlF_6$ increased with increasing fluorine content and the added seeds eroded and dissolved. Two samples of each series, which were in the optimum range of fluoride concentration remained clear or showed very minor precipitation. The sample with the lower fluorine content sometimes yielded only a small amount of $MgAl(NH_4)_5(P_2O_7)_2F_2 \cdot 6H_2O$ (I); the other sample deposited no precipitate and contained only the charged seeds; one mixture contained an insignificant amount of an unidentified solid phase. The chemical analyses of these fully sequestered samples are shown by Group F.[1] Since, in these mixtures, iron is the only other significant cation impurity that may be complexed by fluoride, consideration of a term for iron was necessary to maintain an S.R. of 0.41 at a polyphosphate content of 50 percent; for example, suitable correlations could be obtained when one-third of the weight percent $Fe_2O_3$ was included in the equation.

[1]Table I $$S.R.^1 = \% \ F/Wt. \ \% \ MgO + 3 \ wt.\% \ Al_2O_3 + 1/3 \ wt.\% \ Fe_2O_3$$

[1]As indicated supra, I now prefer to use (2.5% $Al_2O_3$) for this calculation.

These tests indicated that, for this type of fertilizer mixture, the amount of fluorine required to sequester iron is about one-ninth that required for aluminum. It is to be recalled, however, that both orthophosphate and pyrophosphate ions readily form complexes with iron—more so than with aluminum. On the other hand, aluminum forms very stable, soluble complexes with fluorine—more so than iron. Thus, it must be concluded that the lower fluorine requirement of iron results from the existence of iron in complexes with phosphates.

Several other sludged commercial products have been clarified by the addition of soluble fluorides. Many of these were three-component fertilizer liquids in which KCl had also been included, specifically 8-2-5-3 and 7-21-7 grades. The 8-25-3 had an abundant precipitate of $MgAl(NH_4)_5(P_2O_7)_2F_2 \cdot 6H_2O$ (I) (water-insoluble form) and $Al(NH_4)_2P_2O_7OH \cdot 3H_2O$ and required an addition of 3 percent fluoride for clarification to a clear liquid. The 7-21-7 likewise contained $MgAl(NH_4)_5(P_2O_7)_2F_2 \cdot 6H_2O$ (I) and an equally abundant amount of an amorphous unknown gel phase which was misidentified as $(Al,Fe)PO_4 \cdot nH_2O$ in the original application; 1.4 percent fluoride was required to produce a clear liquid fertilizer from this mixture.

EXAMPLE VII

Effect of High Aluminum Contents

Qualitative tests were made on samples of commercial 10-33-0 and 8-25-0, liquid fertilizers prepared from reclaimed phosphoric acid that had been used to pickle aluminum. It was found that very small needle crystals of $Al(NH_4)_2P_2O_7OH \cdot 3H_2O$ precipitated in these solutions and formed a badly gelled mixture that would not pour and could not be pumped from a railroad tank car. The addition of ammonium fluoride equivalent to approximately 2 percent F was made to this gel to provide an S.R. value of 0.4; within 20 hours the precipitate was gone and the mixtures were very fluid. In fact, the treated material had higher clarity than most ammonium polyphosphate liquids prepared from wet-process phosphoric acid.

EXAMPLE VII

This example represents new data obtained subsequent to the filing of my original application due to the discovery that polyphosphate was an important factor. For this example, a 1034-o liquid fertilizer was simulated from reagent chemicals at a polyphosphate level of 10 percent of the total $P_2O_5$ with impurity levels of 1.0 percent MgO, 1.0 percent $Al_2O_3$, 1.0 percent $Fe_2O_3$, and 0.5 percent F. These cation impurities represent near maximum values when compared to commercial 10-34-o liquid fertilizers produced from wet-process phosphoric acids and the 0.5 percent fluoride represents the required S.R. value of 0.12 necessary to sequester the MgO. In preparing this sample, it was obvious that 10 percent polyphosphate was more than sufficient to sequester 1.0 percent $Fe_2O_3$ which was charged as $FePO_4$ and rapidly dissolved, whereas the 1 percent $Al_2O_3$ was charged as $AlPO_4$ and required 2 weeks for dissolution showing that 10 percent polyphosphate is close to the required quantity for sequestering 1 percent $Al_2O_3$. This sample was chosen from a series of similar mixtures which included an increasing concentration for the impurities which also included 0.6 percent, 0.8 percent and 1.2 percent, the first two of which rapidly became clear solutions and the last one not only precipitated a significant quantity of $MgAl(NH_4)_5(P_2O_7)_2F_2 \cdot 6H_2O$ but also contained undissolved $AlPO_4 \cdot nH_2O$ as charged. The absence of a significant precipitate in this sample shows that the pyrophosphate content needs to be approximately five times the weight percent of $Fe_2O_3 + Al_2O_3$. Therefore, this discovery that pyrophosphate levels above this quantity for the purpose of sequestering iron and aluminum represents luxurious consumption of materials and also requires a higher fluoride level for sequestering magnesium, shows that the presently accepted value by the fertilizer industry of 30 percent as a minimum polyphosphate level is sufficient for approximately 6 percent $Al_2O_3 + Fe_2O_3$ which is far above the average sum of 1 to 2 percent $Al_2O_3 + Fe_2O_3$ and represents unnecessary expense.

EXAMPLE VIII

Referring now more specifically to the FIGURE, as has been noted above, the operable and optimum values for S.R. change as or are affected by a change in the percent of the total $P_2O_5$ in the solution present as polyphosphate. It should be appreciated that in some of my earlier work emphasis was supplied for determining the operable and optimum S.R.'s for fertilizer formulations containing right at about 50 percent of the total $P_2O_5$ present therein as polyphosphate, i.e., nonortho acyclic species. This emphasis on 50 percent poly was dictated in part by one school of thought dedicated to the proposition that such ammonium polyphosphate fertilizer solutions require at least this amount of the total $P_2O_5$ present as poly in order to achieve the desired sequestration characteristics relative to the impurities therein, which impurities are congeneric to the wet-process phosphoric acid used in ultimately preparing such solutions. It should, of course, be appreciated that I do not wish to limit my invention only to solutions of this polyphosphate level, as must be apparent from my discussion in Example I, supra, particularly in its relationship to Group A of Table I supra. This is particularly true in view of the somewhat changing attitude that such fertilizer solutions indeed need not necessarily contain such great amounts of poly. Indeed, others skilled in the art who have now been exposed to my teachings have come to appreciate that by practicing the instant invention on fertilizer solutions containing lesser amounts of poly, several advantages, particularly in economics of operation and processing, are attained. Accordingly, the emphasis in this example is on illustrating the effect of the polyphosphate content on the proper value of the sequestration ratio.

To determine the effective range of S.R. (%F/%MgO + 2.5% $Al_2O_3$ + 0.33% $Fe_2O_3$) at various polyphosphate contents, three liquid fertilizers (10-34-o) were prepared from commercial wet-process phosphoric acid. Aliquots of these liquids were then treated with increasingly larger increments of fluoride and subjected to the accelerated storage test as described in the literature (Frazier, A. W. and Lee, R. G., Stabilizing Liquid Fertilizers with Fluorine Compounds, "Fertilizer Solutions," July–August 1972). The three liquid fertilizers gave the following chemical analysis:

| Sample | Total $P_2O_5$ | Poly $P_2O_5$ | Poly % of total | N | MgO | $Al_2O_3$ | $Fe_2O_3$ | F |
|---|---|---|---|---|---|---|---|---|
| 1 | 33.3 | 27.3 | 82 | 10.0 | 0.65 | 0.52 | 0.34 | 0.10 |
| 2 | 34.3 | 18.6 | 46 | 10.3 | 0.46 | 0.71 | 0.81 | 0.10 |
| 3 | 32.8 | 3.9 | 12 | 10.1 | 0.81 | 0.25 | 0.45 | 0.05 |

Samples 1 and 2 were tested from 0.5 to 2.0 percent fluoride and sample 3 from 0.0 to 1.2 percent fluoride. For all three samples a series was obtained similar to those in the photograph of the 8th TVA demonstration display of Oct. 6 and 7, 1970, where those with insufficient fluoride precipitated abundant quantities of $MgAl(NH_4)_5(P_2O_7)_2F_2 \cdot 6H_2O$ and those with an excess of fluoride precipitated the water-soluble salt $(NH_4)_3AlF_6$. The intermediate samples had no precipitate and were taken as the solution compositions which would effectively describe the workable S.R. range at each polyphosphate concentration. The results are shown below:

| Poly-phosphate | %MgO + 2.5% $Al_2O_3$ +0.33% $Fe_2O_3$ | Effective fluoride concentration range | Calculated S.R. range |
|---|---|---|---|
| 82 | 2.07 | 0.9 to 1.7 | 0.44 to 0.82 |
| 46 | 2.51 | 0.9 to 1.6 | 0.36 to 0.65 |
| 12 | 1.635 | 0.2 to 0.9 | 0.12 to 0.55 |

These results are shown in the FIGURE along with the original recommended value. The recommended value represents the minimum amount plus a safe excess to insure optimum results as indicated by line B. The operable range for any given percent poly level is limited by the vertical spacing defined between lines A and C, which lines A and C are shown as essentially straight line plots. As may be seen from the FIGURE, there exists a dependent and essentially straight-line type proportional relationship between the percent of poly level in the solutions and the maximum and minimum for the range of S.R. values. On the other hand, the relationship between the percent poly level and the optimum S.R. that I recommend therefore does not appear to be a straight line function or plot possibly or perhaps because at lower percent poly levels my method of optimizing of the proper S.R. is a bit more subjective in nature.

I claim:

1. A process for stabilizing ammonium polyphosphate fertilizer solutions containing about 50 percent polyphosphate levels against the precipitation of principally the dissolved impurities from the group consisting of magnesium, aluminum, iron, and mixtures thereof, said impurities derived from said wet-process phosphoric acid and providing cations of their dissolved salt solutions which give rise to post-precipitation of complexes therewith with the ammonium polyphosphates in said solutions, said ammonium polyphosphate solutions containing up to about 11 percent by weight nitrogen and 37 percent by weight phosphorus, expressed as $P_2O_5$, said ammonium polyphosphate solutions derived in whole or at least in part from the ammoniation of wet-process phosphoric acid containing greater than 0.1 percent magnesium and greater than 0.1 percent fluoride by a process comprising the addition to said ammonium polyphosphate solutions of a fluorine compound, said fluorine compound selected from the group consisting of simple fluorides, fluosilicates, and mixtures thereof, and wherein the amount of fluorine added to said ammonium polyphosphate solutions for complexing principally the magnesium and aluminum therein to prevent their precipitation is equivalent to a sequestration ratio of between about 0.4 and about 0.5, said sequestration ratio being determined by the empirical formula Sequestration Ratio (S.R.) = Wt. % F/Wt.% MgO + 3 wt% $Al_2O_3$ + 1/3 wt% $Fe_2O_3$

* * * * *